United States Patent
Eryurek

(10) Patent No.: US 6,370,448 B1
(45) Date of Patent: Apr. 9, 2002

(54) COMMUNICATION TECHNIQUE FOR FIELD DEVICES IN INDUSTRIAL PROCESSES

(75) Inventor: Evren Eryurek, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/169,873

(22) Filed: Oct. 12, 1998

Related U.S. Application Data
(60) Provisional application No. 60/061,754, filed on Oct. 13, 1997.

(51) Int. Cl.[7] ............................. G05D 7/00; G06F 19/00
(52) U.S. Cl. ............................. 700/282; 700/2; 700/19; 710/11
(58) Field of Search .................... 700/2, 9, 17, 282, 700/19; 710/711

(56) References Cited

U.S. PATENT DOCUMENTS

| | | | |
|---|---|---|---|
| 3,096,434 A | 7/1963 | King | 549/517 |
| 3,404,264 A | 10/1968 | Kugler | 702/46 |
| 3,468,164 A | 9/1969 | Sutherland | 374/142 |
| 3,590,370 A | 6/1971 | Fleischer | 324/537 |
| 3,688,190 A | 8/1972 | Blum | 324/679 |
| 3,691,842 A | 9/1972 | Akeley | 73/718 |
| 3,701,280 A | 10/1972 | Stroman | 73/861.02 |
| 3,973,184 A | 8/1976 | Raber | 324/537 |
| RE29,383 E | 9/1977 | Gallatin et al. | 137/14 |
| 4,058,975 A | 11/1977 | Gilbert et al. | 60/39.281 |
| 4,099,413 A | 7/1978 | Ohte et al. | 374/75 |
| 4,102,199 A | 7/1978 | Tsipouras | 374/167 |
| 4,122,719 A | 10/1978 | Carlson et al. | 374/167 |
| 4,250,490 A | 2/1981 | Dahlke | 340/870.37 |
| 4,337,516 A | 6/1982 | Murphy et al. | 702/183 |
| 4,399,824 A | 8/1983 | Davidson | 600/549 |
| 4,517,468 A | 5/1985 | Kemper et al. | 290/52 |
| 4,530,234 A | 7/1985 | Cullick et al. | 73/19.02 |

(List continued on next page.)

FOREIGN PATENT DOCUMENTS

| | | |
|---|---|---|
| DE | 32 13 866 A1 | 4/1982 |
| DE | 35 40 204 C1 | 9/1986 |
| DE | 40 08 560 A1 | 3/1990 |
| DE | 43 43 747 A1 | 12/1993 |
| DE | 44 33 593 A1 | 6/1995 |

(List continued on next page.)

OTHER PUBLICATIONS

"Microsoft Press Computer Dictionary" 2nd Edition, 1994, Microsoft Press. p. 156.

U.S. application No. 09/855,179, Eryurek et al., filed May 14, 2001.

U.S. application No. 09/852,102, Eryurek et al., filed May 9, 2001.

"Improving Dynamic Performance of Temperature Sensors With Fuzzy Control Techniques," by Wang Lei et al., pp. 872–873 (1992).

"A TCP/IP Tutorial" by, Socolofsky et al., Spider Systems Limited, Jan. 1991 pp. 1–23.

(List continued on next page.)

Primary Examiner—William Grant
Assistant Examiner—Paul Rodriguez
(74) Attorney, Agent, or Firm—Westman, Champlin & Kelly P.A.

(57) ABSTRACT

A process device is adapted to couple to a process control loop and communicate on the process control loop. Communication on the process control loop is effected in accordance with an internet protocol. A process communication device is also provided which couples to the process control loop, and an internet. The process communication device provides process control information received from the process control loop, to the internet. Conversely, the process communication device also provides information received from the internet to the process control loop.

12 Claims, 8 Drawing Sheets

U.S. PATENT DOCUMENTS

| | | | | |
|---|---|---|---|---|
| 4,571,689 | A | 2/1986 | Hildebrand et al. | 702/58 |
| 4,635,214 | A | 1/1987 | Kasai et al. | 702/183 |
| 4,642,782 | A | 2/1987 | Kemper et al. | 706/53 |
| 4,644,479 | A | 2/1987 | Kemper et al. | 702/185 |
| 4,649,515 | A | 3/1987 | Thompson et al. | 706/52 |
| 4,707,796 | A | 11/1987 | Calabro et al. | 702/34 |
| 4,736,367 | A | 4/1988 | Wroblewski et al. | 370/449 |
| 4,777,585 | A | 10/1988 | Kokawa et al. | 706/52 |
| 4,831,564 | A | 5/1989 | Suga | 702/34 |
| 4,841,286 | A | 6/1989 | Kummer | 340/653 |
| 4,873,655 | A | 10/1989 | Kondraske | 702/86 |
| 4,907,167 | A | 3/1990 | Skeirik | 700/10 |
| 4,924,418 | A | 5/1990 | Bachman et al. | 702/188 |
| 4,934,196 | A | 6/1990 | Romano | 73/861.356 |
| 4,939,753 | A | 7/1990 | Olson | 375/356 |
| 4,964,125 | A | 10/1990 | Kim | 714/26 |
| 4,988,990 | A | 1/1991 | Warrior | 340/825.5 |
| 4,992,965 | A | 2/1991 | Holter et al. | 701/36 |
| 5,005,142 | A | 4/1991 | Lipchak et al. | 702/183 |
| 5,043,862 | A | 8/1991 | Takahashi et al. | 700/42 |
| 5,053,815 | A | 10/1991 | Wendell | 399/10 |
| 5,067,099 | A | 11/1991 | McCown et al. | 702/183 |
| 5,081,598 | A | 1/1992 | Bellows et al. | 702/184 |
| 5,089,984 | A | 2/1992 | Struger et al. | 700/12 |
| 5,098,197 | A | 3/1992 | Shepard et al. | 374/120 |
| 5,099,436 | A | 3/1992 | McCown et al. | 702/82 |
| 5,103,409 | A | 4/1992 | Shimizu et al. | 702/183 |
| 5,111,531 | A | 5/1992 | Grayson et al. | 706/23 |
| 5,121,467 | A | 6/1992 | Skeirik | 706/11 |
| 5,122,794 | A | 6/1992 | Warrior | 340/825.2 |
| 5,122,976 | A | 6/1992 | Bellows | 702/185 |
| 5,130,936 | A | 7/1992 | Sheppard et al. | 702/123 |
| 5,134,574 | A | 7/1992 | Beaverstock et al. | 702/84 |
| 5,137,370 | A | 8/1992 | McCulloch et al. | 374/173 |
| 5,142,612 | A | 8/1992 | Skeirik | 706/23 |
| 5,143,452 | A | 9/1992 | Maxedon et al. | 374/170 |
| 5,148,378 | A | 9/1992 | Shibayama et al. | 702/116 |
| 5,167,009 | A | 11/1992 | Skeirik | 706/23 |
| 5,175,678 | A | 12/1992 | Frerichs et al. | 700/47 |
| 5,193,143 | A | 3/1993 | Kaemmerer et al. | 706/45 |
| 5,197,114 | A | 3/1993 | Skeirik | 706/23 |
| 5,197,328 | A | 3/1993 | Fitzgerald | 73/168 |
| 5,212,765 | A | 5/1993 | Skeirik | 417/44.2 |
| 5,214,582 | A | 5/1993 | Gary | 701/33 |
| 5,224,203 | A | 6/1993 | Skeirik | 706/23 |
| 5,228,780 | A | 7/1993 | Shepard et al. | 374/175 |
| 5,235,527 | A | 8/1993 | Ogawa et al. | 702/116 |
| 5,265,031 | A | 11/1993 | Malczewski | 702/24 |
| 5,265,222 | A | 11/1993 | Nishiya et al. | 706/10 |
| 5,269,311 | A | 12/1993 | Kirchner et al. | 600/485 |
| 5,274,572 | A | 12/1993 | O'Neill et al. | 702/57 |
| 5,282,131 | A | 1/1994 | Rudd et al. | 700/44 |
| 5,282,261 | A | 1/1994 | Skeirik | 706/23 |
| 5,293,585 | A | 3/1994 | Morita | 706/45 |
| 5,303,181 | A | 4/1994 | Stockton | 365/96 |
| 5,305,230 | A | 4/1994 | Matsumoto et al. | 700/287 |
| 5,311,421 | A | 5/1994 | Nomura et al. | 700/37 |
| 5,317,520 | A | 5/1994 | Castle | 702/58 |
| 5,327,357 | A | 7/1994 | Feinstein | 700/271 |
| 5,333,240 | A | 7/1994 | Matsumoto et al. | 706/20 |
| 5,347,843 | A | 9/1994 | Orr et al. | 73/1.34 |
| 5,349,541 | A | 9/1994 | Alexandro, Jr. et al. | 703/18 |
| 5,357,449 | A | 10/1994 | Oh | 702/188 |
| 5,361,628 | A | 11/1994 | Marko et al. | 73/116 |
| 5,365,423 | A | 11/1994 | Chand | 700/12 |
| 5,367,612 | A | 11/1994 | Bozich et al. | 706/23 |
| 5,384,699 | A | 1/1995 | Levy et al. | 250/363.03 |
| 5,386,373 | A | 1/1995 | Keeler et al. | 700/266 |
| 5,394,341 | A | 2/1995 | Kepner | 702/183 |
| 5,394,543 | A | 2/1995 | Hill et al. | 714/26 |
| 5,404,064 | A | 4/1995 | Mermelstein et al. | 310/319 |
| 5,408,406 | A | 4/1995 | Mathur et al. | 700/45 |
| 5,408,586 | A | 4/1995 | Skeirik | 706/25 |
| 5,414,645 | A | 5/1995 | Hirano | 702/185 |
| 5,419,197 | A | 5/1995 | Ogi et al. | 73/659 |
| 5,430,642 | A | 7/1995 | Nakajima et al. | 700/50 |
| 5,440,478 | A | 8/1995 | Fisher et al. | 700/109 |
| 5,442,639 | A | 8/1995 | Crowder et al. | 714/712 |
| 5,467,355 | A | 11/1995 | Umeda et al. | 702/184 |
| 5,469,070 | A | 11/1995 | Koluvek | 324/713 |
| 5,469,156 | A | 11/1995 | Kogura | 340/870.38 |
| 5,469,735 | A | 11/1995 | Watanabe | 73/118.1 |
| 5,481,199 | A | 1/1996 | Anderson et al. | 324/705 |
| 5,483,387 | A | 1/1996 | Bauhahn et al. | 359/885 |
| 5,485,753 | A | 1/1996 | Burns et al. | 73/720 |
| 5,486,996 | A | 1/1996 | Samad et al. | 700/32 |
| 5,488,697 | A | 1/1996 | Kaemmerer et al. | 706/46 |
| 5,489,831 | A | 2/1996 | Harris | 318/701 |
| 5,495,769 | A | 3/1996 | Broden et al. | 73/718 |
| 5,510,779 | A | 4/1996 | Maltby et al. | 340/870.3 |
| 5,511,004 | A | 4/1996 | Dubost et al. | 702/183 |
| 5,548,582 | A | 8/1996 | Keeler et al. | 702/22 |
| 5,561,599 | A | 10/1996 | Lu | 700/44 |
| 5,570,300 | A | 10/1996 | Henry et al. | 702/45 |
| 5,572,420 | A | 11/1996 | Lu | 700/33 |
| 5,573,032 | A | 11/1996 | Lenz et al. | 137/486 |
| 5,598,521 | A | 1/1997 | Kilgore et al. | 345/326 |
| 5,600,148 | A | 2/1997 | Cole et al. | 250/495.1 |
| 5,623,605 | A | 4/1997 | Keshav et al. | 709/236 |
| 5,637,802 | A | 6/1997 | Frick et al. | 73/724 |
| 5,640,491 | A | 6/1997 | Bhat et al. | 706/25 |
| 5,661,668 | A | 8/1997 | Yemini et al. | 702/186 |
| 5,665,899 | A | 9/1997 | Willcox | 73/1.63 |
| 5,669,713 | A | 9/1997 | Schwartz et al. | 374/1 |
| 5,671,335 | A | 9/1997 | Davis et al. | 706/25 |
| 5,675,504 | A | 10/1997 | Serodes et al. | 702/25 |
| 5,675,724 | A | 10/1997 | Beal et al. | 714/24 |
| 5,680,109 | A | 10/1997 | Lowe et al. | 340/608 |
| 5,700,090 | A | 12/1997 | Eryurek | 374/210 |
| 5,703,575 | A | 12/1997 | Kirpatrick | 340/870.17 |
| 5,704,011 | A | 12/1997 | Hansen et al. | 706/25 |
| 5,705,978 | A | 1/1998 | Frick et al. | 340/511 |
| 5,708,585 | A | 1/1998 | Kushion | 701/108 |
| 5,710,708 | A | 1/1998 | Wiegland | 700/139 |
| 5,713,668 | A | 2/1998 | Lunghofer et al. | 374/179 |
| 5,719,378 | A | 2/1998 | Jackson, Jr. et al. | 219/497 |
| 5,741,074 | A | 4/1998 | Wang et al. | 374/185 |
| 5,742,845 | A | 4/1998 | Wagner | 710/11 |
| 5,746,511 | A | 5/1998 | Eryurek et al. | 374/2 |
| 5,752,008 | A | 5/1998 | Bowling | 703/13 |
| 5,764,891 | A | 6/1998 | Warrior | 710/72 |
| 5,781,878 | A | 7/1998 | Mizoguchi et al. | 701/109 |
| 5,801,689 | A | 9/1998 | Huntsman | 345/329 |
| 5,805,442 | A | 9/1998 | Crater et al. | 700/9 |
| 5,828,567 | A | 10/1998 | Eryurek et al. | 700/79 |
| 5,829,876 | A | 11/1998 | Schwartz et al. | 707/1 |
| 5,848,383 | A | 12/1998 | Yunus | 702/104 |
| 5,859,964 | A | 1/1999 | Wang et al. | 714/48 |
| 5,876,122 | A | 3/1999 | Eryurek | 374/183 |
| 5,887,978 | A | 3/1999 | Lunghofer et al. | 374/179 |
| 5,923,557 | A | 7/1999 | Eidson | 700/129 |
| 5,924,086 | A | 7/1999 | Mathur et al. | 706/25 |
| 5,926,778 | A | 7/1999 | Pöppel | 702/130 |
| 5,940,290 | A | 8/1999 | Dixon | 700/9 |
| 5,956,663 | A | 9/1999 | Eryurek | 702/183 |
| 5,970,430 | A | 10/1999 | Burns et al. | 702/122 |
| 6,016,706 | A | 1/2000 | Yamamoto et al. | 73/727 |
| 6,017,143 | A | 1/2000 | Eryurek et al. | 700/51 |
| 6,045,260 | A | 4/2000 | Schwartz et al. | 374/183 |

| | | | | |
|---|---|---|---|---|
| 6,047,220 A | * | 4/2000 | Eryurek | 700/10 |
| 6,047,222 A | | 4/2000 | Burns et al. | 700/79 |
| 6,119,047 A | | 4/2000 | Eryurek et al. | 700/28 |
| 6,192,281 B1 | * | 2/2001 | Brown et al. | 700/2 |
| 6,195,591 B1 | * | 2/2001 | Nixon et al. | 700/83 |
| 6,199,018 B1 | | 3/2001 | Quist et al. | 702/34 |
| 6,263,487 B1 | | 7/2001 | Stripf et al. | 717/1 |
| 6,298,377 B1 | * | 10/2001 | Hartikainen et al. | 709/223 |

FOREIGN PATENT DOCUMENTS

| | | |
|---|---|---|
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1989 |
| GB | 2 310 346 A | 8/1997 |
| JP | 58-129316 | 8/1983 |
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 01-72699 | 3/1989 |
| JP | 2-5105 | 1/1990 |
| JP | 3-212799 | 9/1991 |
| JP | 5-122768 | 5/1993 |
| JP | 06242192 | 9/1994 |
| JP | 7-63586 | 3/1995 |
| JP | 07225530 | 8/1995 |
| JP | 07234988 | 9/1995 |
| JP | 8-54923 | 2/1996 |
| JP | 8-136386 | 5/1996 |
| JP | 8-166309 | 6/1996 |
| JP | 08247076 | 9/1996 |
| JP | 2712625 | 10/1997 |
| JP | 2712701 | 10/1997 |
| JP | 10-232170 | 9/1998 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 00/70531 | 11/2000 |

OTHER PUBLICATIONS

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50. Feb. 1992, pp. 1–93.

"Fieldbus Standard for Use in Industrial Control System Part 3 Data Link Service Definition", ISA–S50. Feb. 1997, Part 3, Aug. 1997, pp. 1–159.

Fieldbus Standard For Use in Industrial Control Systems Part 4: Data Link Protocol Specification, ISA–S50. Feb. 1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding Foundation™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–46.

"Modular Microkernel Links GUI And Browser For Embedded Web Devices" by, Tom Williams, pp. 1–22.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

U.S. application No. 09/576,719, Coursolle et al., May 23, 2000.

U.S. applicatoin No. 09/799,824, Rome et al., filed Mar. 3, 2001.

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Fault Diagnosis of Fieldbus Systems," by Jürgen Quade, pp. 577–581 (10,92).

"Profibus–Infrastrukturmaßnahmen," by Tilo Pfeifer et al., pp. 416–419 (8/91).

"Simulation des Zeitverhaltens von Feldbussystemen," by O. Schnelle, pp. 440–442 (1991).

"Process Measurement and Analysis," by Liptak et al., Instrument Engineers' Handbook, Third Edition, pp. 528–530, (1995).

"Internal Statistical Quality Control for Quality Monitoring Instruments", by P. Girling et al., ISA, 15 pgs., 1999.

Web Pages from www.triant.com (3 pgs.).

"Statistical Process Control (Practice Guide Series Book)", Instrument Society of America, 1995, pp. 1–58 and 169–204.

"Time–Frequency Analysis of Transient Pressure Signals for a Mechanical Heart Valve Cavitation Study," ASAIO Journal, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," Process Engineering, by Dr. Ronald Young, pp. 47 and 49 (Jan. 1990).

"Quantification of Heart Valve Caviation Based on High Fidelity Pressure Measurements," Advances in Bioengineering 1994, by Laura A. Garrison et al., BED–vol. 28, pp. 297–298 (Nov. 6–11, 1994).

"Monitoring and Diagnosis of Caviation in Pumps and Valves Using the Wigner Distribution," Hydroaccoustic Facilities, Instrumentation, and Experimental Techniques, NCA–vol. 10, pp. 31–36 (1991).

"Developing Predictive Models for Caviation Erosion," Codes and Standards in A Global Environment, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A New Method of Johnson Noise Thermometry", by C.J. Borkowski et al., Rev. Sci. Instrum., vol. 45, No. 2, (Feb. 1974) pp. 151–162.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

Instrument Engineers' Handbook, Chapter IV entitled "Temperature Measurements," by T.J. Claggett, pp. 266–333 (1982).

Microsoft Press Computer Dictionary, $3^{rd}$ Edition, p. 124.

"On–Line Statistical Process Control for a Glass Tank Ingredient Scale," by R.A. Weisman, IFAC real Time Programming, 1985, pp. 29–38.

"The Performance of Control Charts for Monitoring Process Variation," by C. Lowry et al., Commun. Statis.—Simula., 1995, pp. 409–437.

"A Knowledge–Based Approach for Detection and Diagnosis of Out–Of–Control Events in Manufacturing Processes," by P. Love et al., IEEE, 1989, pp. 736–741.

U.S. application No. 09/169,873, Eryurek et al., filed Oct. 12, 1998.

U.S. application No. 09/175,832, Eryurek et al., filed Oct. 19, 1998.

U.S. application No. 09/257,896, Eryurek et al., filed Feb. 25, 1999.

U.S. application No. 09/303,869, Eryurek et al., filed May 3, 1999.

U.S. application No. 09/335,212, Kirkpatrick et al., filed Jun. 17, 1999.

U.S. application No. 09/344,631, Eryurek et al., filed Jun. 25, 1999.

U.S. application No. 09/360,473, Eryurek et al., filed Jul. 23, 1999.

U.S. application No. 09/369,530, Eryurek et al., filed Aug. 6, 1999.

U.S. application No. 09/383,828, Eryurek et al., filed Aug. 27, 1999.

U.S. application No. 09/384,876, Eryurek et al., filed Aug. 27, 1999.

U.S. application No. 09/406263, Kirkpatrick et al., filed Sep. 24, 1999.

U.S. application No. 09/409,098, Eryurek et al., filed Sep. 30, 1999.

U.S. application No. 09/409,114, Eryurek et al., filed Sep. 30, 1999.

U.S. application No. 09/565,604, Eruyrek et al., filed May 4, 2000.

U.S. application No. 09/576,450, Wehrs, filed May 23, 2000.

U.S. application No. 09/606,259, Eryurek, filed Jun. 29, 2000.

U.S. application No. 09/616,118, Eryurek et al., filed Jul. 14, 2000.

U.S. application No. 09/627,543, Eryurek et al., filed Jul. 28, 2000.

"Advanced Engine Diagnostics Using Universal Process Modeling", by P. O'Sullivan, Presented at the 1996 SAE Conference on Future Transportation Technology, pp. 1–9.

Parallel, Fault–Tolerant Control and Diagnostics System for Feedwater Regulation in PWRS, by E. Eryurek et al., Proceedings of the American Power Conference.

"Programmable Hardware Architectures for Sensor Validation", by M.P. Henry et al., Control Eng. Practice, vol. 4, No. 10., pp. 1339–1354, (1996).

"Sensor Validation for Power Plants Using Adaptive Back-propagation Neural Network," *IEEE Transactions on Nuclear Science*, vol. 37, No. 2, by E. Eryurek et al. Apr. 1990, pp. 1040–1047.

"Signal Processing, Data Handling and Communication: The Case for Measurement Validation", by M.P. Henry, *Department of Engineering Science, Oxford University.*

"Smart Temperature Measurement in the '90s", by T. Kerlin et al., *C&I,* (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods," *EPRI*, Jul. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600°C", by M.J. de Groot et al., *Cal Lab*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field–based Architecture is Based on Open Systems, Improves Plant Performance", by P. Cleaveland, *I&CS*, Aug. 1996, pp. 73–74.

"Tuned–Circuit Dual–Mode Johnson Noise Thermometers," by R.L. Shepard et al., Apr. 1992.

"Tuned–Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long–Life, High–Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., Presented at the 6th Symposium on Space Nuclear Power Systems, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1–50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault–Tolerant Interface for Self–Validating Sensors", by M.P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference.*

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7, pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances in Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990 pp. 2–10.

"Neural Networks for Sensor Validation and Plantwide Monitoring," by E. Eryurek, 1992.

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{th}$. WWW Conference Workshop on Embedded Web Technology, Santa Clara, CA (Apr. 7, 1997).

* cited by examiner

COMMUNICATION TECHNIQUE FOR FIELD DEVICES IN INDUSTRIAL PROCESSES

This application claims the benefit of U.S. Provisional Application No. 60/061,754, filed Oct. 13, 1997 and entitled TRANSMITTERS AS THIN WEB SERVERS, herein incorporated by reference.

BACKGROUND OF THE INVENTION

The invention relates to the fluid process control industry. More specifically, the invention relates to field devices used in the process control industry and the manner in which those field devices communicate.

Field devices such as transmitters, are used in the process control industry to remotely sense a process variable. Field devices such as actuators, are used by the process control industry to remotely control physical parameters of a process, such as flow rate, temperature, etc. The process variable may be transmitted to a control room from a field device such as a transmitter for providing information about the process to a controller. A controller may then transmit control information to a field device such as an actuator to modify a parameter of the process. For example, information related to pressure of a process fluid may be transmitted to a control room and used to control a process such as oil refining.

Process variable transmitters are used to monitor process variables associated with fluids such as slurries, liquids, vapors and gasses in chemical, pulp, petroleum, gas, pharmaceutical, food and other fluid processing plants. Process variables include pressure, temperature, flow, level, pH, conductivity, turbidity, density, concentration, chemical composition and other fluid properties. Process actuators include control valves, pumps, heaters, agitators, coolers, solenoids, vents and other fluid controlling devices.

One typical prior art technique for transmitting information involves controlling the amount of current flowing through a process control loop. Current is supplied from a current source in the control room and the transmitter controls the current from its location in the field. For example, a 4 mA signal can be used to indicate a zero reading and a 20 mA signal can be used to indicate a full scale reading.

More recently, transmitters have employed digital circuitry which communicates with a controller using a digital signal which is superimposed onto the analog current signal flowing through the process control loop. One example of such a technique is the Hart Foundation HART® communication protocol. The HART® protocol and other such protocols typically include a set of commands or instructions which can be sent to the field device to elicit a desired response, such as device control or interrogation.

Fieldbus, another communication protocol, is proposed by the Foundation™ Fieldbus and is directed to defining a communication layer or protocol for transmitting information on a process control loop. The Fieldbus protocol specification is ISA-S50.01-1992, promulgated by the Instrument Society of America in 1992. Fieldbus is a process industry communications protocol described in Fieldbus Technical Overview Understanding Foundation™ fieldbus technology (1998) available from Rosemount Inc. in Eden Prairie, Minn. Some protocols comparable to Fieldbus include Controller Area Network (CAN), Lonworks, and Profibus. In the Fieldbus protocol, the current flowing through the process control loop is not used to transmit an analog signal. Instead, all information is digitally transmitted. Further, the Fieldbus protocol allows field devices to be configured in a multi-drop configuration in which more than one field device is connected on the same process control loop.

The HART® protocol and more recently the Fieldbus protocol have been relatively effective at communicating process information over process control loops. Current process control systems generally include many field devices and actuators coupled to a given process control loop which is in turn coupled to a controller. If it is desirable to provide process control information on an enterprise-wide level, such as throughout an entire company, the controller itself is coupled to an enterprise-wide data network, such as an Ethernet data network, and the controller provides information about the process to the enterprise.

SUMMARY OF THE INVENTION

The invention includes a process device which is adapted to couple to a process control loop and communicate on the process control loop. Communication on the process control loop is effected in accordance with an internet protocol.

A process communication device is also provided which is adapted to couple to a process control loop, and the Internet. The process communication device provides process control information received from the process control loop, to the internet. Conversely, the process communication device also provides information received from the internet to the process control loop.

DETAILED DESCRIPTION OF THE PREFERRED EMBODIMENTS

Figure 1:
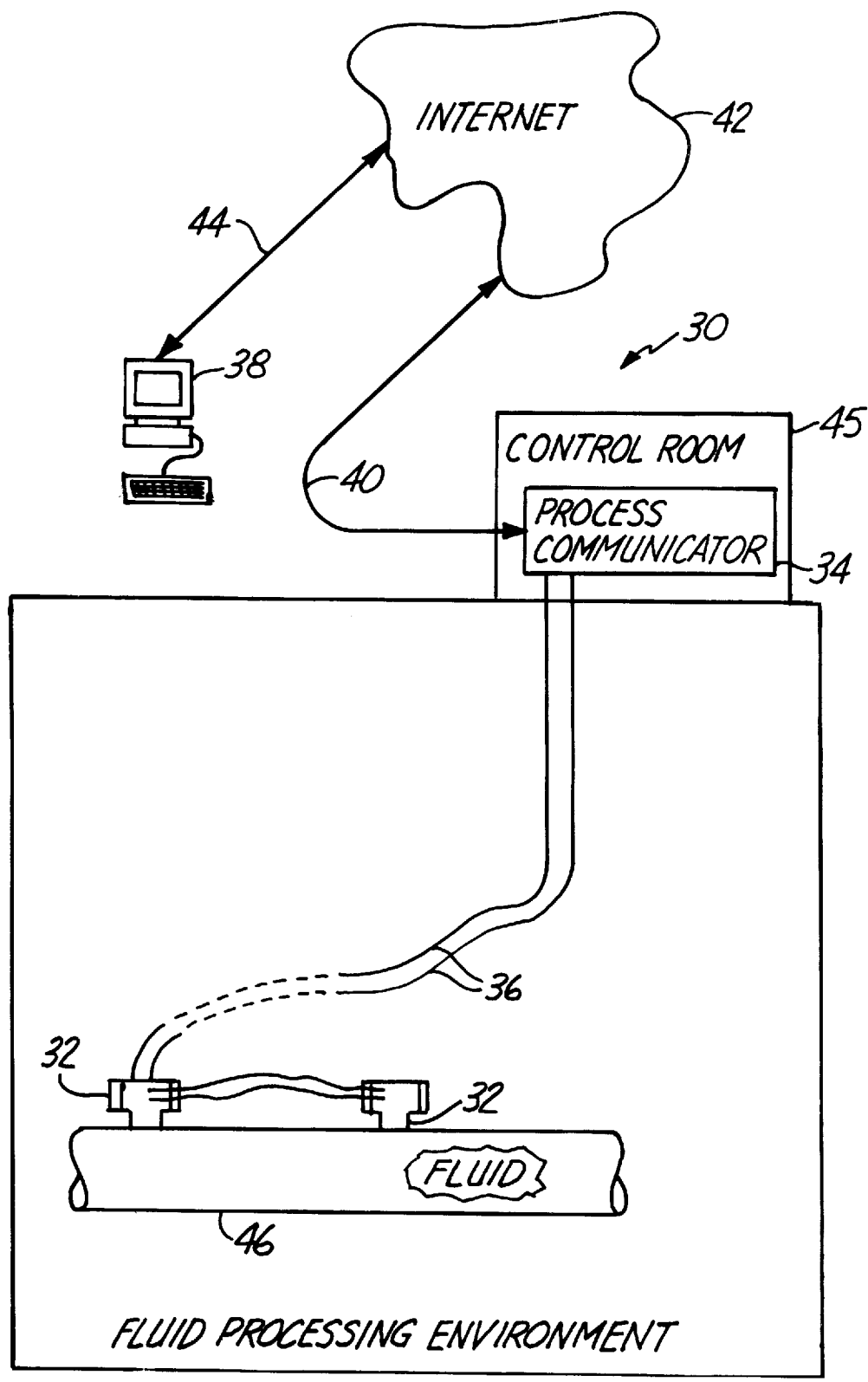
FIG. 1 is a system block diagram of a process control system in accordance with an embodiment of the invention.

FIG. 1 is a system block diagram of process control system 30 showing the environment of one embodiment of the invention. Process control system 30 includes process devices 32 coupled to a process communication device 34 through process control loop 36. Process communication device 34 is coupled to computer 38 (also referred to as client node 38) through communication link 40, internet 42, and node link 44. Process communication device 34 may be disposed in a control room such as control room 45 which may provide an intrinsic safety barrier in accordance with APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988.

Fluid processing environments are a special application for process devices such as transmitters and actuators because vapors can be present in these environments which can be ignited by an electrical spark having enough energy to ignite the vapors. Accordingly, communication busses in fluid processing environments typically are energy limited. Multiple redundant circuits are used to ensure that energy levels on the busses are below a safe energy level so that they cannot produce ignition of flammable vapors, even under fault conditions. Transmitters and actuators are energy limited. Busses which pass through the safe area of the fluid processing environment to outside equipment such as control room equipment typically pass through energy limiting barriers so that a fault outside the fluid processing environment cannot cause a spark inside the frequently explosive fluid processing environment. Busses which have the potential for higher level signals which could spark under fault conditions are often not permitted to pass through or connect to equipment in a fluid processing environment. A typical internet connection, such as communication link 40 or node link 44 is thus normally excluded from the fluid processing environment because its physical layer lacks electrical energy limiting safety features. In some cases, explosion-proof housings and conduits are used to contain high energy or power circuits to provide energy limiting.

Process devices 32 are coupled to a process fluid container such as pipe 46 as shown in FIG. 1. A process device is any device which either relates a signal to a process parameter, or responsively effects a change in a process parameter. As such, process devices 32 may be transmitters sensing a process variable such as pressure, temperature or level in a process container such as pipe 46. Further, process devices 32 may also be actuators controlling a process variable such as fluid flow or temperature, or a device which monitors operation of a process or sends information related to the process on a process control loop.

Process control loop 36 couples process devices 32 to process communication device 34 and may supply energization current to process devices 32. A process control loop may be any process control configuration where two or more conductors provide communication for devices on the loop. As such, process control loop 36 may be a process control loop in accordance with such process communication protocols as the low-speed Fieldbus protocol (H1), the high-speed Fieldbus protocol (H2), the HART® protocol, or other suitable protocols which provide transmission of digital information on a process control loop.

Process communication device 34 is coupled to communication link 40. Communication link 40 may be any appropriate data connection, such as an Ethernet data connection (as defined by IEEE 802.3, promulgated by the Institute of Electrical and Electronic Engineers), or a point-to-point serial modem connection. As will be described later in greater detail, process communication device 34 is adapted to communicate on process control loop 36, and on communication link 40. As such, when process communication device 34 receives data from communication link 40, process communication device 34 places such data on process control loop 36. Conversely, when process communication device 34 receives process control data from two-wire process control loop 36, process communication device 34 places such data on communication link 40.

As can be seen in FIG. 1, communication link 40 is coupled to internet 42. Internet 42 is any combination of two or more data networks coupled together. For example, internet 42 may be the public Internet, or internet 42 may also be a private, enterprise-wide intranet. Internet 42 is coupled to client node 38 through node link 44. As with communication link 40, node link 44 may be any appropriate link, for example, an Ethernet connection, or a point-to-point serial modem connection.

As will be described in greater detail later in the specification, devices 32, 34, 38 are adapted for internet communication. An example of such internet adaptation includes the use of an internet protocol suite known as Transmission Control Protocol/Internet Protocol (also referred to as TCP/IP) . Transmission Control Protocol/Internet Protocol is a known internet protocol suite which is generally used for data communication over the public Internet. A Brief Tutorial of the TCP/IP Internet Protocol Suite may be obtained from the Network Working Group as RFC 1180, published January 1991.

When devices 32, 34, and 38 are adapted for internet communication using Transmission Control Protocol/Internet Protocol, client node 38 may access process devices 32 by sending a process information request to an internet address of one of process devices 32. Through known methods, the information request is eventually passed through the internet to process communication device 34. Process communication device 34 transforms the request to a form appropriate for transmission upon process control loop 36 and routes the request to the correct process device according to destination information contained in the request.

The request is received by the destination process device 32 which responsively provides process control information back to client node 38 through communication link 40, internet 42, and node link 44. This process control information may be in accordance with Hypertext Transfer Protocol or any other suitable protocol. Hypertext Transfer Protocol has been used by the World-Wide Web global information initiative since 1990. A specification reflecting common usage of this protocol may be obtained from the Network Working Group as RFC: 1945.

The data in accordance with Hypertext Transfer Protocol may include, for example, Hypertext Markup Language commands, Java applets, messages, or Active X data. Those skilled in the art will appreciate from FIG. 1 and this related discussion, that process device; 32 may act as web servers to client node 38. Further, client node 38 may access process devices 32 through industry-standard web browser software such as Internet Explorer which is available from Microsoft, Inc.

Figure 2:
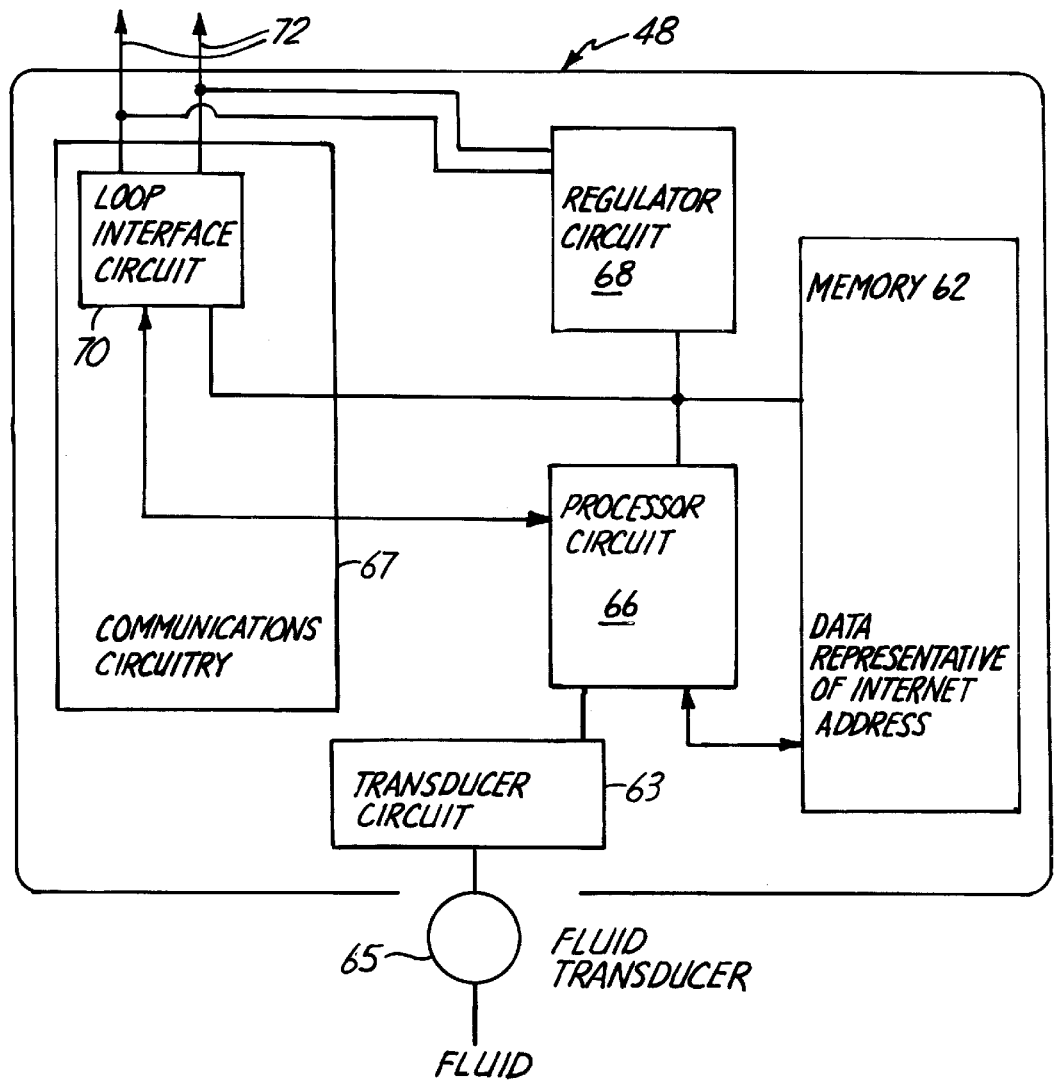
FIG. 2 is a system block diagram of a process device in accordance with an embodiment of the invention.

FIG. 2 is a system block diagram of process device 48 in accordance with an embodiment of the invention. Process device 48 can be a process variable transmitter or a process actuator, depending on the type of transducer connected to process device 48. Process variable transmitters are used to monitor process variables associated with fluids such as slurries, liquids, vapors and gasses in chemical, pulp, petroleum, gas, pharmaceutical, food and other fluid processing plants. Process variables include pressure, temperature, flow, level, pH, conductivity, turbidity, density, concentration, chemical composition and other fluid properties. Process actuators include control valves, pumps, heaters, agitators, coolers, vents and other fluid controlling devices. Process device 48 includes regulator circuit 68, communication circuitry 67 including loop interface circuit 70, processor circuit 66, and memory 62, and transducer circuit 63. Transducer circuit 63 couples to a transducer 65 which can be either part of the process device 48, or external and connected by a short cable. Fluid transducer 65 transduces a property of a fluid as shown. Transducer 65 can be a sensor or, alternatively an actuator. A circuit, such as loop interface circuit 70, may be any electrical configuration (hardware, software or combination of the two) which is arranged to produce a given result.

Regulator circuit 68 may be any circuitry which conveys power to the various components of process device 48 with power received from process control loop 72. Regulator circuit 68 is adapted to couple to process control loop 72 to power process device 48 with power received from process control loop 72. In fact, regulator circuit 68 may even wholly power all electrical components of process device 48. As such, regulator circuit 68 is coupled to loop interface circuit 70, processor circuit 66, and memory 62 to provide power to those respective circuits.

Loop interface circuit 70 may be any circuit which is adapted for digital communication on a process control loop. Through loop interface circuit 70, process device 48 is adapted to couple to process control loop 72 to send and receive loop signals to and from process control loop 72. For example, if process device 48 is to operate in accordance with one of the Fieldbus protocols, loop interface circuit 70 is adapted to send and receive Fieldbus data packets on process control loop 72.

Memory 62 may be any arrangement which has more than one state, and may be either permanently or selectively maintained in either state such as electrical, magnetic, etc. Memory 62 is operably coupled to processor circuitry 66. Memory 62 may store process information, communication information, device status information or a sequence of program steps to be performed by processor circuit 66. Further, memory 62 may contain portions which provide random access, or read-only access. Additionally, memory 62 may be electrically erasable, such as an electrically erasable programmable read-only memory. Memory 62 stores data representative of an internet address for the process device 48.

Process device 48 is adapted to transduce a fluid property and communicate process control information related to the fluid property through a fluid processing environment (FIG. 1) to a remote location. Transducer circuit 63 is adapted to couple to fluid transducer 65 and couple a signal representing the transduced fluid property to or from processor circuit 66 which passes it on to or from communication circuitry 67. Communication circuitry 67 is adapted to couple to an energy limited communication bus 72 passing through the fluid handling environment. The communication circuitry communicates process control information related to the transduced fluid property over the communication bus. Memory 62 coupled to the communication circuitry is adapted to store data representing an address identifying the process device. The address data stored represents an internet address and the communication circuitry communicates process control information together with data representative of the internet address in an energy limited form to the energy limited communication bus. The data stored in memory 62 which is representative of the internet address can be stored as the internet address itself, as data pointing to the process device's internet address stored in another device, or as data from which its address can be computed, or other convenient way of storing a representation of the address. This unique arrangement allows process device 48 to safely communicate over bus 72 in an energy limited fashion, including data which represents the internet address of the device 48. When the bus passes through to an unprotected area, the address is then directly available outside the fluid handling area for communication with an internet which does not have the energy limiting features.

Processor circuit 66 may be embodied in discrete circuitry, a microprocessor, a programmable logic array or any other suitable device. Processor circuit 66 is operably coupled to loop interface circuit 70 and memory 62. Processor circuit 66 may be adapted to receive a sensor output from transducer circuit 63 which is indicative of a process variable. Processor circuit 66 is adapted to send data to and receive data from loop interface circuit 70 which data is suitable for internet transmission.

Figure 3:
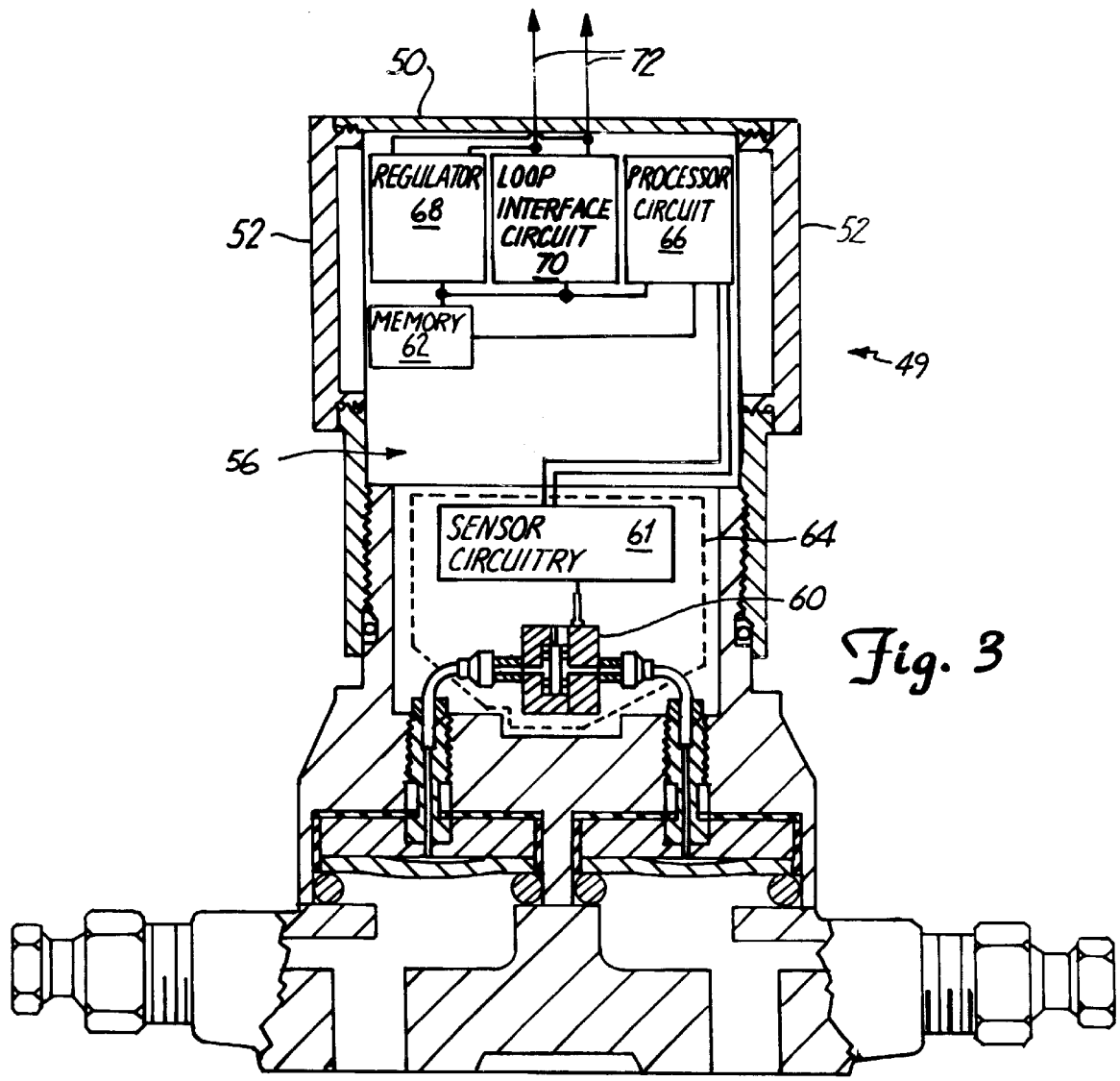
FIG. 3 is a cross-section view of a process device in accordance with an embodiment of the invention.

FIG. 3 is a cross-section view of process device 49 in accordance with an embodiment of the invention. Process device 49 is one type of process device 32 (shown in FIG. 1). Process device 49 may be constructed to be suitable for hazardous environments. As such, process device may be intrinsically safe in accordance with the intrinsic safety standard specified above, or explosion-proof, in accordance with APPROVAL STANDARD FOR EXPLOSION-PROOF ELECTRICAL EQUIPMENT GENERAL REQUIREMENTS, Class Number 3615, as promulgated by Factory Mutual Research March 1989. Thus, such a process device may be suitable for operation in hazardous environments.

Process device 49 includes housing 50 which, in cooperation with covers 52 encloses transmitter electronics 56. Process device 49 also includes sensor unit 64 which is adapted to couple to a process and provide an output which is related to a process variable. In some embodiments, sensor unit 64 may be disposed outside of process device 49. Sensor unit 64 may be any system which couples to a physical process and provides an electrical output that is related to a process variable. Sensor unit 64 may include a process sensor, such as a pressure sensor, and sensor circuitry such as circuitry 61 which may provide such features as signal linearization or the like. Sensor unit 64 is coupled to processor 66 of transmitter electronics 56.

In one embodiment of the invention, at least a portion of data transferred between processor circuit 66 and loop interface circuit 70 is in accordance with the Hypertext Transfer Protocol.

In a another embodiment of the invention, memory 62 stores internet address data which uniquely identifies process device 49 on an internet. The address data may comprise at least four groups of data where each group has at least eight bits. Such an address may be expressed with each group of bits corresponding to its decimal equivalent. For example, an internet address may be 201.138.92.5 which may correspond to a computer named "Rosemount.com". It should be noted however, that the internet address may include additional address information such as a subnet mask address or the like.

In this embodiment, process device 49 is particularly useful in situations where process control loop 72 has been adapted for internet addressing. Thus, instead of having process control loop source and destination addresses, process control loop packets would have source and destination internet addresses. In such a case, processor circuit 66 cooperates with loop interface circuit 70 to selectively interact with process control loop data packets which have an internet address matching that stored in memory 62. A packet is a group of digital information such as a series of digital bits.

In another embodiment of the invention, memory 62 stores data in accordance with Hypertext Markup Language. Memory 62 is coupled to processor circuit 66 such that processor circuit 66 selectively provides the Hypertext Markup Language from memory 62 to loop interface circuit 70.

In this embodiment, process control device 49 is useful for sending and receiving Hypertext Markup Language data to and from process control loop 72.

In yet another embodiment of the invention, processor circuit 66 is adapted to format the sensor output received from sensor unit 64 in accordance with an internet protocol. The internet protocol may be any appropriate internet protocol such as Internet Protocol as specified in RFC: 791, promulgated by the Internet Engineering Task Force September, 1981. Processor circuit 66 provides the internet-formatted sensor output to loop interface circuit 70 which then further formats the internet-formatted sensor output for transmission upon process control loop 72.

For example, the sensor output may be a byte of digital information which is indicative of the process variable. Processor circuit 66 may then encapsulate the byte with additional digital information indicative of an internet address to which the sensor output byte will travel. The combination of internet address and data byte may be considered as an internet data packet which is provided by processor circuit 66 to loop interface circuit 70. Loop interface circuit 70 receives the data packet and formats the data packet for transmission upon process control loop 72, which may be for example a Fieldbus process control loop. As such, in this embodiment, loop interface circuit 70 adds additional data to the internet data packet to route the internet data packet on process control loop 72.

Figure 4:
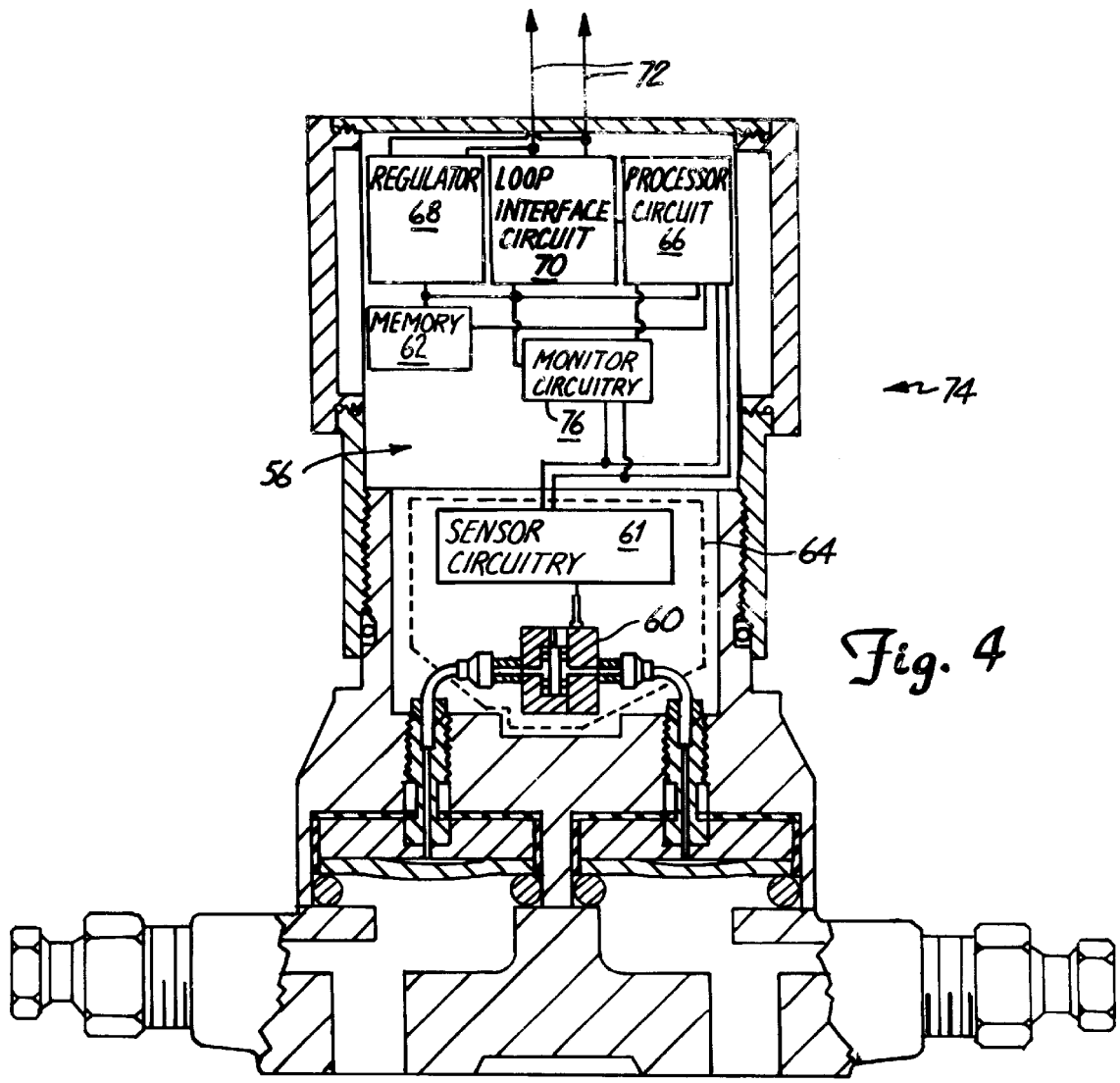
FIG. 4 is a cross-section view of a process device in accordance with an embodiment of the invention.

FIG. 4 is a cross-section view of process device 74 in accordance with another embodiment of the invention. Process device 74 is identical to process device 49 (shown in FIG. 3) with the exception of monitor circuitry 76, and similar components are numbered similarly. Monitor circuitry 76 may be any circuitry which senses or determines the occurrence of an event and provides a signal related to the occurrence. Monitor circuitry 76 is operably coupled to sensor system 64, and processor circuit 66. Further, monitor circuitry 76 may also be coupled to regulator circuit 68 to receive power from process control loop 72 through regulator circuit 68. Monitor circuitry 76 monitors the output from sensor system 64 to determine the occurrence of an event such as a sensor failure, alarm condition or the like.

In response to the occurrence of the event, monitor circuitry 76 causes processor circuit 66 to generate an event data packet in accordance with an internet protocol for transmission on process control loop 72. The event data packet may be any body of digital information which is related to the event. The event data packet may be indicative of the event itself, the sensor output, or both. The event data packet may be in accordance with Hypertext Transfer Protocol. Additionally, the event data packet may be selected to cause a destination device such as client node 38 (shown in FIG. 1) to execute a query upon receiving the event data packet. The event data packet may also be selected to cause another process device on the process control loop, or across an internet, to perform an action, such as closing a valve. Further, process circuitry 66 may generate additional packets which report actions taken by processor 66 in response to the event, and such report packets could be addressed through an internet to an alphanumeric pager, or the like.

In one example, monitor circuitry 76 may determine that a sensor has failed and provide a signal related to such occurrence to processor 66. Processor 66 may then send commands to other process devices to enter a fail-safe mode. Processor 66 could then send additional information to a pager, alerting a supervisor to the condition.

Figure 5:
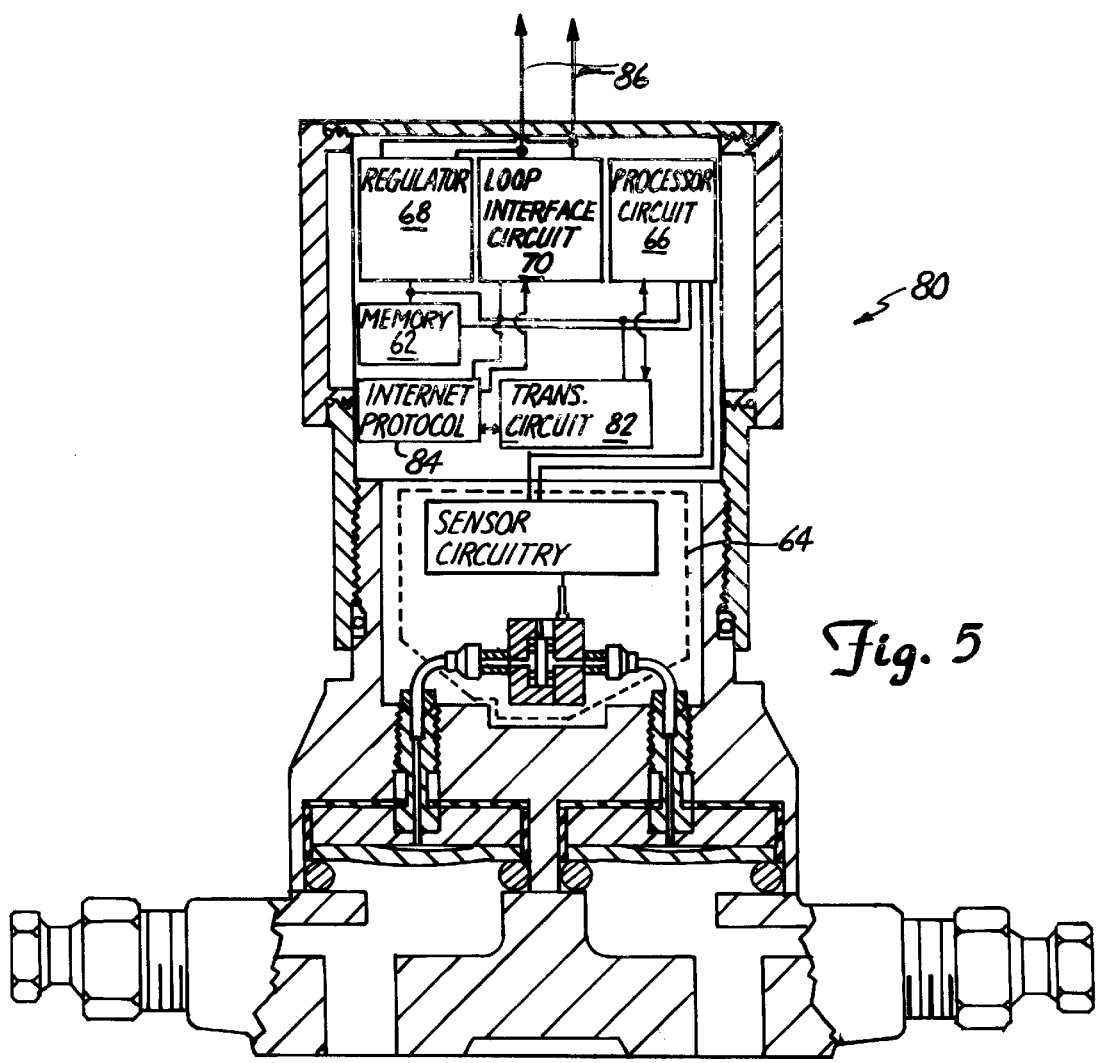
FIG. 5 is a cross-section view of a process device in accordance with an embodiment of the invention.

FIG. 5 is a cross-section view of process device 80 in accordance with another embodiment of the invention. Process device 80 includes some components which are similar, or identical to components in the above described embodiments, and such components are numbered similarly. Process device 80 includes regulator 68, loop interface circuit 70, processor circuit 66, memory 62, internet protocol circuit 84, and transmission circuit 82.

Loop interface circuit 70 is coupled to internet protocol circuit 84 which is further coupled to transmission circuit 82. Transmission circuit 82 is coupled to processor circuit 66.

Processor circuit 66 is adapted to receive an output signal from sensor system 64, which is indicative of a process variable. Processor circuit 66 provides output data which, for example, may be indicative of the sensor output signal. Additionally, processor circuit 66 may be adapted, to receive input data from transmission circuit 82.

Transmission circuit 82 is coupled to processor circuit 66 to receive the output data from processor circuit 66. Transmission circuit 82 may also provide the input data to processor circuit 66. Transmission circuit 82 transforms the output data received from processor circuit 66 into output segments to be provided to internet protocol circuit 84. Conversely, transmission circuit 82 also assembles input segments received from internet protocol circuit 84 into input data to be provided to processor circuitry 66. A segment is any data passed between transmission circuit 82 and internet circuit 84.

Transmission circuit 82 may operate in accordance with various transmission control protocols such as Transmission Control Protocol (TCP) as defined in RFC 793, promulgated by the Internet Engineering Task Force, or User Datagram Protocol (UDP) as defined in RFC 768, promulgated by the Internet Engineering Task Force. Further, the data exchanged between transmission circuit 82 and processor circuit 66 may be in any of a variety of suitable protocols such as Hypertext Transfer Protocol, File Transfer Protocol (FTP), Simple Message Transfer Protocol (SMTP), Telnet Protocol, Simple File Transfer protocol (SFTP), or Trivial File Transfer Protocol (TFTP).

Internet protocol circuit 84 is operably coupled to transmission circuit 82 and is adapted to provide an output packet for each output segment received from transmission circuit 82. An output packet generally comprises an output segment provided by transmission circuit 82, data indicative of the transmission protocol used by transmission circuit 82, and an internet address to which the packet will travel. Thus, if transmission circuit 82 uses Transmission Control Protocol (TCP) to create the output segments, the output packets would so indicate.

Internet protocol circuit 84 may be adapted to receive input packets from loop interface circuitry 70 and selectively provide input segments to transmission circuit 82. Such selection, is based upon checking data in the input packets to determine if the input packets have been formatted in accordance with the same transmission protocol as that provided by transmission circuit 82. If the input packets have been so formatted, then input segments, corresponding to the input packets are provided from internet protocol circuit 84 to transmission circuit 82.

Loop interface circuitry 70 is adapted to generate process control loop signals in response to and based upon reception of output packets from internet protocol circuit 84. Further, loop interface circuitry 70 may also be adapted to selectively provide input packets to internet protocol circuit 84 based upon received process control loop signals.

Although the present invention as been described with respect to process devices providing sensor information on a process control loop, those skilled in the art will appreciate that the present invention is equally applicable to process devices which receive information from the process control loop and responsively cause a physical change in a process.

For example, in FIG. 5, replacing sensor system 64 with an actuator system such as a valve would allow processor circuit 66 to provide digital output signals to the actuator system to thereby modify a process variable. This substitution would essentially convert any of the process devices described above into process devices which physically affect a process. Further, it is entirely within the scope of the present invention to provide a process device which not only senses a process variable, but also affects a process variable. Further, although the embodiments shown in FIGS. 2 through 5 are described with respect to individual circuits, such notation is merely provided for clarity. Thus, the present invention may be practiced by combining various modules on an application specific integrated circuit, or by implementing the various circuits in a microprocessor with software.

Figure 6:
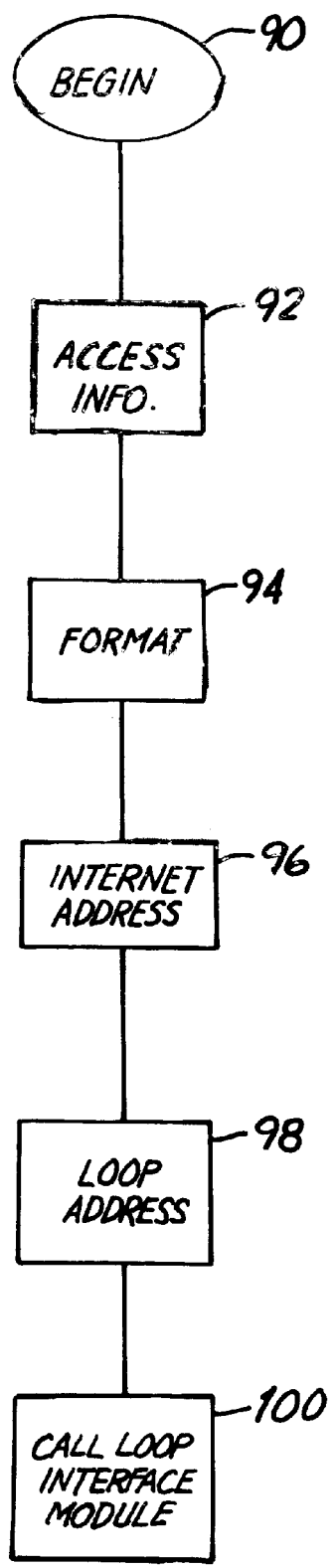
FIG. 6 is a flow chart of a sequence of process steps to implement an embodiment of the invention with software.

FIG. 6 is a block diagram of a sequence of program steps which could be implemented on processor 66 to practice the invention. The sequence shown in FIG. 6 depicts how a process device in accordance with an embodiment of the invention acts as an internet information server.

Server operation begins when the processor receives a request for information as indicated at block 90. Such a request may come from a device such as client node 38 (shown in FIG. 1) or from an internal device such as a timer. Those skilled in the art will appreciate that if a timer is used, then the process device essentially pushes process information to a destination device.

At block 92, the processor determines what information is requested and accesses the requested information. For example, the request may be directed to obtaining process control information, process device information, or both. Block 92 is completed when the processor stores the requested information in memory, such as memory 62 (shown in FIGS. 2–5).

At block 94, the processor formats the requested information for internet transmission. When a relatively large amount of information is to be transmitted, information must be broken up into discrete segments. In this case formatting would likely entail breaking the requested data into segments such as those in accordance with Transmission Control Protocol. However, if the amount of requested information is sufficiently small, other suitable protocols may be used such as, User Datagram Protocol. Block 94 is concluded when the processor stores the formatted information in memory along with an indication of which particular type of formatting protocol was used.

After block 94, the processor executes the program step shown at block 96. Specifically, additional information such as an internet address of the destination device (generally the requesting device), and an internet address of the process device are stored in memory along with the formatted requested information.

At step 98, additional information is accessed by the processor to determine a process control loop address of a communication device which will forward the information on to the internet. Such information is stored in memory along with a process control loop address of the process device (source address).

At block 100, the processor provides the stored memory contents formatted requested information; format type; internet addresses; and process control loop addresses) to a Loop interface module which interacts with hardware to introduce signals onto the process control loop which correspond to the memory contents.

Figure 7:
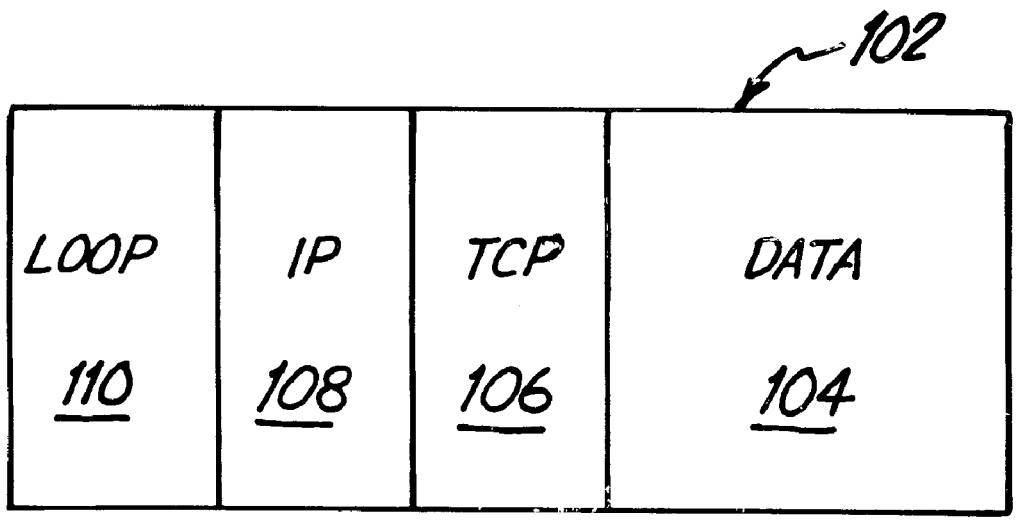
FIG. 7 is diagrammatic view of a data structure in accordance with an embodiment of the invention.

FIG. 7 is a block diagram of a data structure 102 in accordance with an embodiment of the invention. Data structure 102 includes data block 104, transmission control protocol header 106, internet protocol header 108, and process control loop header 110. The data structure shown in FIG. 7 may take various specific forms such as, when data 104 is a combination of process information and Hypertext Markup Language data; transmission control protocol header 106 is in accordance with User Datagram Protocol; IP header 108 is in accordance with Internet Protocol; and loop header 110 is in accordance with the Fieldbus protocol. Further, data trailers may also be used, such as an end delimiter for the process control loop. Those skilled in the art will appreciate that a variety of combinations are possible with the invention. The data structure shown in FIG. 7 is assembled in a process device prior to transmission on a process control loop, and is also received from a process control loop in order to have data 104 extracted. As such, data structure 102 may be found in memory in a given process device, in transit across a process control loop, or in a memory of a process communication device.

Figure 8:
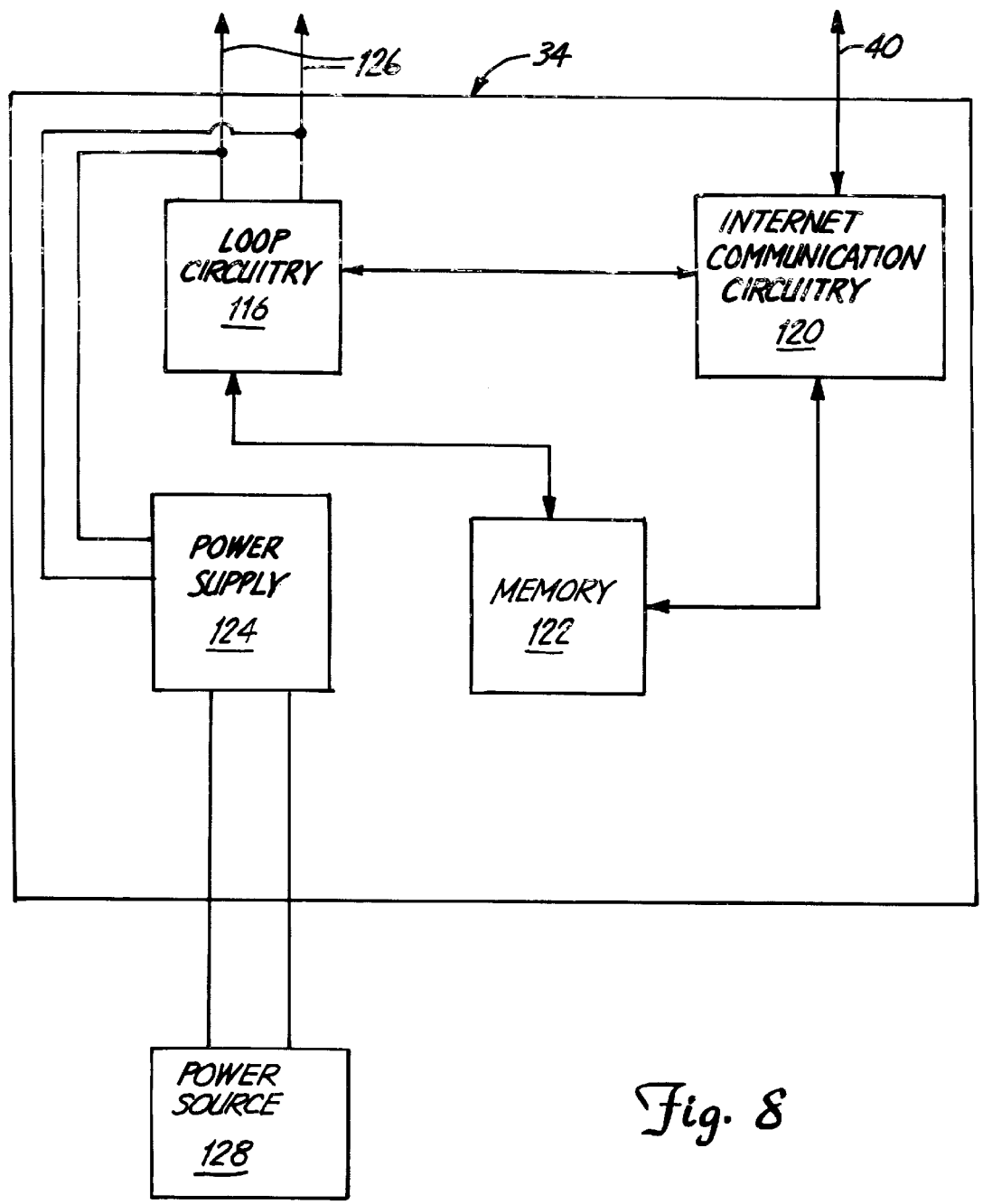
FIG. 8 is a system block diagram of a process communication device in accordance with an embodiment of the invention.

FIG. 8 a system block diagram of process communication device 34 in accordance with an embodiment of the invention. Process communication device 34 includes loop communication circuitry 116, internet communications circuitry 120, memory 122, and power supply circuit 124. Loop communication circuitry 116 is adapted to couple to process control loop 126 to send and receive process control loop signals to and from process control loop 126. It should be noted that process control loop 126 may be any appropriate process control loop which provides digital communication between devices on the process control loop. Loop communication circuitry 116 is coupled to memory 122 which contains data indicative of a loop address of communication device 34 on process control loop 126. Thus, loop communication circuitry 116 is able to determine when process control loop data is addressed to process communication device 34 by comparing the loop address contained in memory 122 with destination device information received from the process control loop 126. Loop communication circuitry 116 is coupled to internet communication circuitry 120.

Internet communication circuitry 120 is adapted to couple to an internet through communication link 40. Internet communication circuitry 120 is coupled to memory 122, which contains data indicative of an internet address of communication device 34.

When process communication device 34 is operating to transmit data from process control loop 126 to an internet, loop communication circuitry 116 receives a loop packet from process control loop 126 which contains the loop address of process communication device 34 as stored in memory 122. Loop communication circuitry 116 is adapted to extract an internet packet from the loop packet which is received from process control loop 126. An internet packet is any body of data which includes internet routing data such as an IP address. Loop communication circuitry 116 provides the extracted internet packet to internet communication circuitry 120 which formats the packet for transmission through link 40. Internet communication circuitry 120 then transmits the formatted internet packet through link 40 into the internet to which link 40 is connected.

When process communication device 34 works in the opposite direction, an internet packet which has been formatted for transmission through link 40 arrives at internet communication circuitry 120. Internet communication circuitry 120 extracts the internet packet from the data received from link 40. Internet communication circuitry 120 then determines if the destination for the received internet packet is a process control device which resides upon process control loop 126. If so, internet communication circuitry 120 passes the internet packet to loop communication circuitry 116 which encapsulates the internet packet with process control loop routing information and introduces the so formatted packet onto process control loop 126 for transmission to the destination process control device.

As can be seen in FIG. 8, communication device 34 also includes power supply 124 which is adapted to couple to process control loop 126 to inject power into process control loop 126. Power supply 124 may be coupled to a power source 128 which is external to process control loop 126.

In some embodiments of the invention, the format of loop packets may be the same as the format of information received from link 40. For example, when link 40 is in accordance with an Ethernet data network, and process control loop 126 is in accordance with highspeed Fieldbus (H2), the packets may be so similar, that little if any reformatting is required. In this embodiment, process communication device 34 still adapts the data by changing signal levels. Thus, although an Ethernet network may not be intrinsically safe, process communication device 34 may affect the signal levels to such an extent that intrinsic safety compliance of process control loop 126 is maintained.

As can be appreciated, the present invention provides a variety of process devices, and a process communication device which allow for individual process devices to serve as internet communication devices. Thus, a transmitter in accordance with the present invention may perform the function of a web server allowing a variety of users employing various platforms to access transmitter data and receive process information. Further, software updates can now be provided to the process devices through the public Internet, thus reducing administrative effort. Additionally, users of the present invention by interacting through the internet with the process devices can effect process changes. As can also be appreciated, because the present invention employs traditional process control loops, the present invention may be practiced with intrinsically safe process control devices without endangering intrinsic safety compliance. The various embodiments set forth herein may be implemented alone or in combination(s) as desired or as appropriate.

Although the present invention has been described with reference to preferred embodiments, workers skilled in the art will recognize that changes may be made in form and detail without departing from the spirit and scope of the invention.

What is claimed is:

1. A process device adapted to couple to a fluid process control loop, the process device comprising:
   a regulator circuit adapted to couple to the process control loop and power the process device with power received from the process control loop;
   loop interface circuitry adapted to couple to the process control loop to send and receive loop signals to and from the process control loop;
   processor circuitry operably coupled to the loop interface circuitry, the processor circuitry adapted to receive a sensor output;
   a memory operably coupled to the processor circuitry, the memory containing an internet address of the process device, the internet address comprising at least four groups of data each group comprising at least eight bits; and
   wherein the loop interface circuitry is configured to receive data packets from the process control loop which contain the internet address and to transmit data packets on the process control loop which include the internet address.

2. The process device of claim 1 wherein the internet address is an Internet Protocol address as defined by RFC 791, promulgated by the Internet Engineering Task Force September, 1981.

3. A process device adapted to couple to a fluid process control loop, the process device comprising:
   means for providing power to the process device with power received from the process control loop;
   means for storing an internet address; and
   means for sending and receiving data containing the internet address to and from the process control loop.

4. A process device adapted to couple to a fluid process control loop, the process device comprising:
   loop interface circuitry adapted to couple to the process control loop to send and receive loop signals to and from the process control loop;
   processor circuitry operably coupled to the loop interface circuitry, the processor circuitry adapted to receive a sensor output and format the sensor output in accordance with an internet protocol as defined by RFC 791, promulgated by the Internet Engineering Task Force, September, 1981 and provide the formatted sensor output to the loop interface circuitry for transmission on the process control loop.

5. The process device of claim 4 and further comprising a regulator circuit adapted to couple to the process control loop and power the process device with power received from the process control loop.

6. The process device of claim 4 wherein the process control loop is a two-wire process control loop.

7. A process device adapted to couple to a fluid process control loop, the process device comprising:
   a regulator circuit adapted to couple to the process control loop and power the process device with power received from the process control loop;
   loop interface circuitry adapted to couple to the process control loop to generate process control loop signals in accordance with a process control loop protocol in response to reception of output packets, and selectively provide input packets based upon received process control loop signals;
   internet protocol circuitry operably coupled to the loop interface circuitry and adapted to provide the output packets to the loop interface circuitry in accordance with an internet protocol and based upon output segments received by the internet protocol circuitry, each output packet comprising an output segment, a source internet address, a destination internet address, and data indicative of a transport type, the internet protocol circuitry further adapted to receive the input packets from the loop interface circuitry;
   transmission circuitry operably coupled to the internet protocol circuitry and adapted to transform output data received by the transmission circuitry into the output segments, and assemble input segments received from the internet protocol circuitry into input data; and
   processor circuitry adapted to receive a sensor output, and provide the output data to the transmission circuitry and receive input data from the transmission circuitry.

8. The process device of claim 7 wherein the transmission circuitry transforms data in accordance with Transmission Control Protocol as defined by RFC 793, promulgated by the Internet Engineering Task Force.

9. The process device of claim 7 wherein the transmission circuitry transforms data in accordance with User Datagram Protocol as defined by RFC 768, promulgated by the Internet Engineering Task Force.

10. A data structure embodied in a fluid process device, the data structure comprising:

a data field;

a transmission control header;

an internet protocol header; and a process control loop header.

11. A process device adapted to couple to a fluid process control loop, the process device comprising:

a regulator circuit adapted to couple to the process control loop and power the process device with power received from the process control loop;

loop interface circuitry adapted to couple to the process control loop to send and receive loop signals to and from the process control loop;

processor circuitry operably coupled to the loop interface circuitry, the processor circuitry adapted to receive a sensor output; and a memory coupled to the processor circuitry and adapted to store instructions for execution upon the processor circuitry, the instructions comprising:

an internet formatting routine for formatting the sensor output in accordance with an internet protocol to provide an internet-formatted output;

a loop formatting routine for further formatting the internet-formatted output for transmission on the process control loop to provide a loop-forward output;

an output routine to cause the processor circuitry to provide the loop formatted output to the loop interface circuitry for transmission on the process control loop.

12. A process communication device adapted to couple to a fluid process control loop, the device comprising:

a memory adapted to contain data indicative of a loop address of the device, and an internet address of the device;

loop communication circuitry, coupled to the memory, and adapted to communicate on the process control loop;

internet communication circuitry coupled to the loop communication circuitry and the memory, and adapted to couple to an internet to communicate on the internet; and wherein the internet communication circuitry passes information received from the internet to the loop communication circuitry for transmission upon the process control loop, and the loop communication circuitry passes information received from the process control loop to the internet communication circuitry for transmission upon the internet.

* * * * *

UNITED STATES PATENT AND TRADEMARK OFFICE
CERTIFICATE OF CORRECTION

PATENT NO.    : 6,370,448 B1
DATED         : April 9, 2002
INVENTOR(S)   : Evren Eryurek It is certified that error appears in the above-identified patent and that said Letters Patent is hereby corrected as shown below:

Column 14,
Line 4, replace "loop-forward" with -- loop formatted --.

Signed and Sealed this

First Day of October, 2002

Attest:

Attesting Officer

JAMES E. ROGAN
Director of the United States Patent and Trademark Office